US008683284B2

(12) United States Patent
Fujii (10) Patent No.: US 8,683,284 B2
(45) Date of Patent: Mar. 25, 2014

(54) RECEIVING APPARATUS AND METHOD

(75) Inventor: Masaaki Fujii, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1125 days.

(21) Appl. No.: 12/117,917

(22) Filed: May 9, 2008

(65) Prior Publication Data

US 2009/0080579 A1 Mar. 26, 2009

(30) Foreign Application Priority Data

Sep. 25, 2007 (JP) ................................ 2007-248045
Jan. 7, 2008 (KR) ........................ 10-2008-0001821

(51) Int. Cl.
*H04L 1/18* (2006.01)
(52) U.S. Cl.
USPC ........................................................ 714/748
(58) Field of Classification Search
USPC ........................................................ 714/748
See application file for complete search history.

(56) References Cited

U.S. PATENT DOCUMENTS

| 6,519,731 | B1 | 2/2003 | Huang et al. | |
|---|---|---|---|---|
| 2001/0056560 | A1 | 12/2001 | Khan et al. | |
| 2003/0063588 | A1 | 4/2003 | Lee et al. | |
| 2008/0070649 | A1* | 3/2008 | Uchida | 455/575.4 |
| 2009/0070649 | A1* | 3/2009 | Aldana et al. | 714/748 |
| 2009/0249151 | A1* | 10/2009 | Zhou et al. | 714/748 |
| 2010/0064193 | A1* | 3/2010 | Huschke et al. | 714/748 |
| 2010/0180170 | A1* | 7/2010 | Seo et al. | 714/748 |
| 2010/0262885 | A1* | 10/2010 | Cheng et al. | 714/749 |

FOREIGN PATENT DOCUMENTS

| JP | 2005-311717 | 11/2005 |
|---|---|---|
| KR | 1020020046547 | 6/2002 |
| KR | 1020070034426 A | 3/2007 |
| WO | WO 2005/078976 | 8/2005 |

OTHER PUBLICATIONS

International Search Report, Jun. 10, 2005, of PCT/US05/03889, International Search Report, Form PCT/ISA/210.
Evaluation of HARQscheme with antenna permutation and TCM reassignment for space-time transmission in slow Nakagami-Rice fading MIMO channel,Koike et al.,2004, Scopus,p. 1-3.
Zero-Forcing Methods for Downlink Spatial Multiplexing in Multiuser MIMO Channels, Quentin Spencer et al., pp. 461-471, IEEE Transactions on Signal Processing, Feb. 2004.
Antenna Combining for the MIMO Downlink Channel, Nihar Jindal,pp. 3834-3844, IEEE Transcations on Wireless Communications, Oct. 2008.

* cited by examiner

*Primary Examiner* — Amine Riad
(74) *Attorney, Agent, or Firm* — NSIP Law

(57) ABSTRACT

A receiving apparatus includes a combining and quantizing unit that combines channel vectors corresponding to a combination of a plurality of antennas in order to generate a combination channel vector and selects a predetermined quantization vector according to the generated combination channel vector, an error detecting unit that detects whether there is an error in received signals, and an antenna switchover unit that switches over the combination of the antennas according to a result of the error detection, in which the combining and quantizing unit feeds an index of the selected predetermined quantization vector back to a transmitting apparatus. In this way, diversity effect can be obtained by means of repeat control while reducing the amount of feedback information.

18 Claims, 10 Drawing Sheets

RECEIVING APPARATUS AND METHOD

CROSS-REFERENCE TO RELATED APPLICATIONS

This application claims the benefit of Japanese Patent Application No. 2007-248045, filed on Sep. 25, 2007, and Korean Patent Application No. 2008-1821, filed in the Korean Intellectual Property Office on Jan. 7, 2008, the disclosures of which are incorporated herein by reference.

BACKGROUND OF THE INVENTION

1. Field of the Invention

Aspects of the present invention generally relate to a receiving apparatus and method, and more particularly, to a receiving apparatus and method included in a multiple-input and multiple-output (MIMO) system of a mobile communication system, and a transmitting apparatus and method corresponding to the receiving apparatus and method.

2. Description of the Related Art

A multiple-input and multiple-output (MIMO) scheme is one technique for speeding up communication between wireless devices. The MIMO scheme is based on signal input/output operations using a plurality of antennas. The MIMO scheme is characterized in that a plurality of transmission data can be collectively transmitted at the same timing and at the same frequency using a plurality of different antennas. Thus, with an increase in the number of channels that can be transmitted at the same time, the amount of data that can be transmitted per unit time can also be increased by the increase in the number of channels. This scheme can improve communication speed without increasing occupied frequency band.

However, due to the simultaneous transmission of a plurality of modulation signals having carrier components of the same frequency, a reception side needs a way to separate the modulation signals. Thus, the reception side estimates a channel matrix indicating the transmission characteristics of a transmission path and separates a transmission signal corresponding to each sub-stream from a reception signal based on the estimated channel matrix. The channel matrix is estimated using a pilot symbol.

A transmission signal needs to be precisely reconstructed for each sub-stream by sufficiently removing influences of noise added to the transmission path or interference between sub-streams. Recently, various techniques for MIMO signal detection have been developed. Much attention has been given to a multi-user MIMO system including a plurality of communication devices capable of performing MIMO signal transmission. Signal detection in a multi-user MIMO system may use a minimum mean squared error (MMSE) detection method. The MMSE detection method involves processes in which a reception side calculates a signal power to interference plus noise power ratio (SINR) after MMSE detection in order to feed the calculated SINR back to a transmission side and the transmission side sets transmission control parameters based on the SINR in order to improve transmission characteristics. In order to further improve transmission characteristics compared to the MMSE detection method, the reception side in the multi-user MIMO system may use a maximum likelihood (ML) detection method.

SUMMARY OF THE INVENTION

Aspects of the present invention provide a receiving apparatus and method having a diversity effect using repeat control while reducing the amount of information fed back to a transmitting apparatus, and a transmitting apparatus and method corresponding to the receiving apparatus and method.

According to an aspect of the present invention, a receiving apparatus is provided. The receiving apparatus includes a plurality of antennas to receive signals, a combining and quantizing unit, an error detecting unit, and an antenna switchover unit. The combining and quantizing unit combines channel vectors corresponding to a combination of the plurality of antennas in order to generate a combination channel vector and selects a predetermined quantization vector according to the generated combination channel vector. The error detecting unit detects an error in the received signals. The antenna switchover unit changes the combination of the antennas according to a result of the error detection. The combining and quantizing unit feeds an index of the selected predetermined quantization vector back to a transmitting apparatus.

According to another aspect of the present invention, a receiving method. The receiving method includes receiving signals via a plurality of antennas, combining channel vectors corresponding to a combination of the plurality of antennas in order to generate a combination channel vector and selecting a predetermined quantization vector according to the generated combination channel vector, detecting an error in the received signals, switching over the combination of the antennas according to a result of the error detection, and feeding an index of the selected predetermined quantization vector back to a transmitting apparatus.

According to another aspect of the present invention, a computer-readable recording medium having recorded thereon a program to execute the receiving method is provided.

According to another aspect of the present invention, a transmitting apparatus is provided. The apparatus includes a repeat controlling unit, a beamforming matrix calculating unit, and a beamforming unit. The repeat controlling unit determines whether to retransmit transmission data according to a predetermined signal fed back from a receiving apparatus. The beamforming matrix calculating unit calculates a beamforming matrix corresponding to a channel matrix based on an index of a predetermined quantization vector fed back from the receiving apparatus according to a result of the determination. The beamforming unit performs beamforming on a transmission signal by using the calculated beamforming matrix and transmits the transmission signal that has undergone the beamforming.

According to another aspect of the present invention, a transmitting method is provided. The method includes determining whether to retransmit transmission data according to a predetermined signal fed back from a receiving apparatus, calculating a beamforming matrix corresponding to a channel matrix based on an index of a predetermined quantization vector fed back from the receiving apparatus according to a result of the determination, and performing beamforming on a transmission signal using the calculated beamforming matrix and transmitting the transmission signal that has undergone the beamforming.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Prior to a description of embodiments of the present invention, technology associated with each embodiment of the present invention will be briefly described with reference to FIGS. 1 through 6.

I. Automatic Repeat Control Method of an Antenna Cyclic Shift Type

Figure 1:
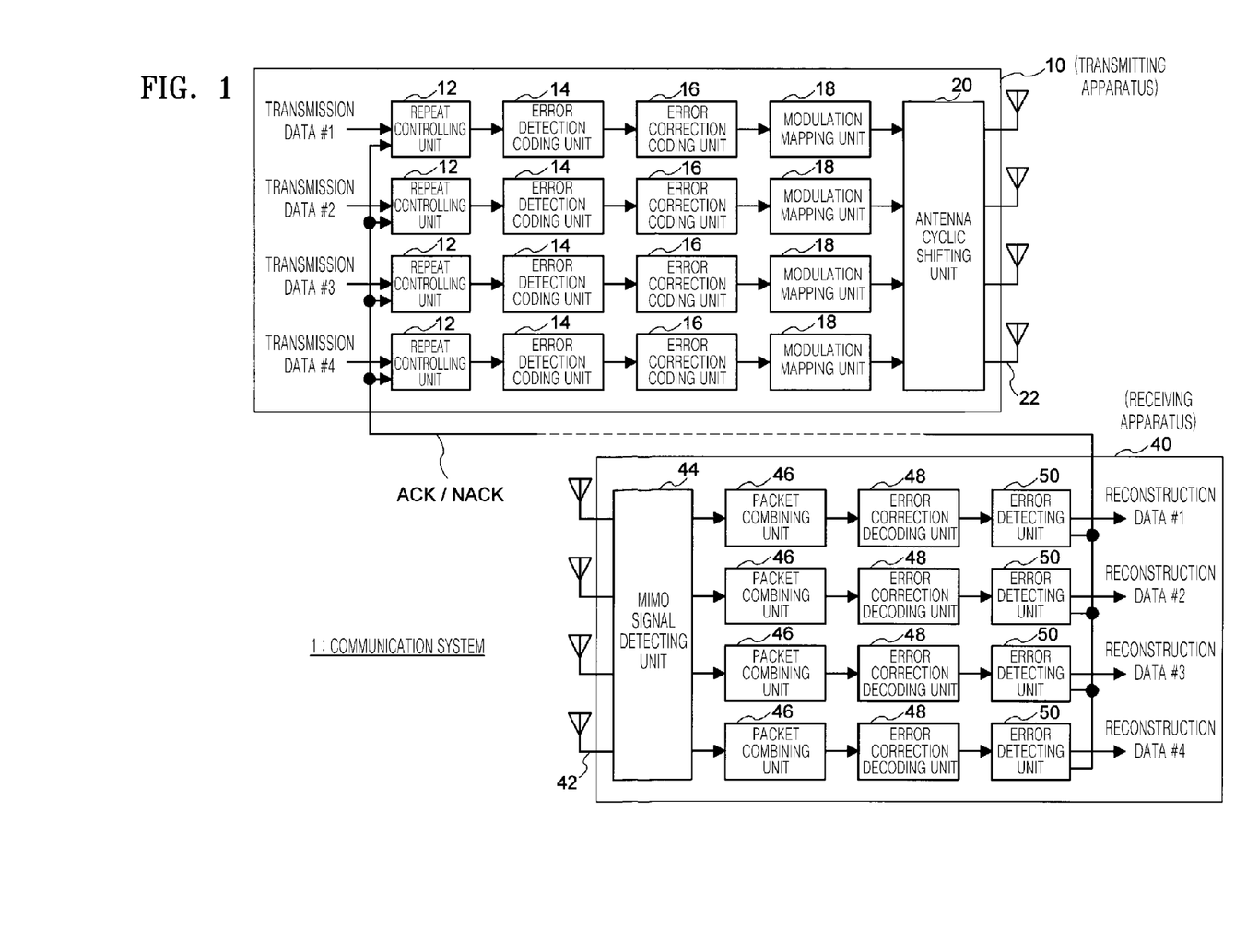
FIG. 1 is a block diagram of a communication system capable of performing automatic repeat control of an antenna cyclic shift type.

FIG. 1 is a block diagram of a communication system 1 capable of performing automatic repeat control of an antenna cyclic shift type. The communication system 1 of the antenna cyclic shift type is a multiple-input and multiple-output (MIMO) system using a hybrid automatic repeat request (ARQ) scheme, and includes a transmitting apparatus 10 and a receiving apparatus 40.

1. Structure of the Transmitting Apparatus 10

The transmitting apparatus 10 includes repeat controlling units 12, error detection coding units 14, error correction coding units 16, modulation mapping units 18, an antenna cyclic shifting unit 20, and a plurality of antennas 22. The transmitting apparatus 10 may include additional and/or different units. Similarly, the functionality of two or more of the above units may be integrated into a single component.

Transmission data is generated for each stream and is input to each of the repeat controlling units 12. The repeat controlling units 12 input new transmission data or previously transmitted transmission data to the error detection coding units 14 according to an acknowledgement/non-acknowledgement (ACK/NACK) signal fed back by the receiving apparatus 40. The error detection coding units 14 add a predetermined error detection code to the input transmission data. The error detection code may be a cyclic code, a Hamming code, a Reed-Solomon code, or a turbo code.

The transmission data having the error detection code added thereto is input to the error correction coding units 16. The error correction coding units 16 add an error correction code to the input transmission code. The transmission data having the error correction code added thereto is input to the modulation mapping units 18. The modulation mapping units 18 perform modulation mapping on the input transmission data based on a predetermined modulation method in order to generate a transmission symbol for each stream. A transmission symbol vector having the transmission symbol for each stream as a component is input to the antenna cyclic shifting unit 20. The antenna cyclic shifting unit 20 performs cyclic shift on a combination of the antennas 22 having transmission symbol vector allocated thereto. Even when the same packet as a previously transmitted packet is transmitted, different channel gains can be obtained at each cyclic shift.

2. Structure of the Receiving Apparatus 40

The receiving apparatus 40 includes a plurality of antennas 42, a MIMO signal detecting unit 44, packet combining units 46, error correction decoding units 48, and error detecting units 50. The MIMO signal detecting unit 44 detects a transmission signal for each stream from a reception signal received through each of the plurality of antennas 42 based on a previously estimated channel matrix, and inputs the detected transmission signal to the packet combining unit 46.

If the input transmission signal is a retransmitted signal, the packet combining units 46 combine a transmission signal, which has an error detected but is not yet retransmitted, with the input transmission signal, and input the resulting combination transmission signal to the error correction decoding unit 48. The error correction decoding units 48 perform error correction decoding using a predetermined error correction code added by the transmitting apparatus 10 in order to reconstruct transmission data, and input the reconstructed transmission data to the error detecting units 50.

The error detecting units 50 perform error detection on the transmission data based on a predetermined error detection code added by the transmitting apparatus 10. If an error is detected, the error detecting units 50 feed a NACK signal to the transmitting apparatus 10. If no error is detected, the error detecting units 50 feed an ACK signal to the transmitting apparatus 10.

3. Flow of Automatic Repeat Control

Figure 2:
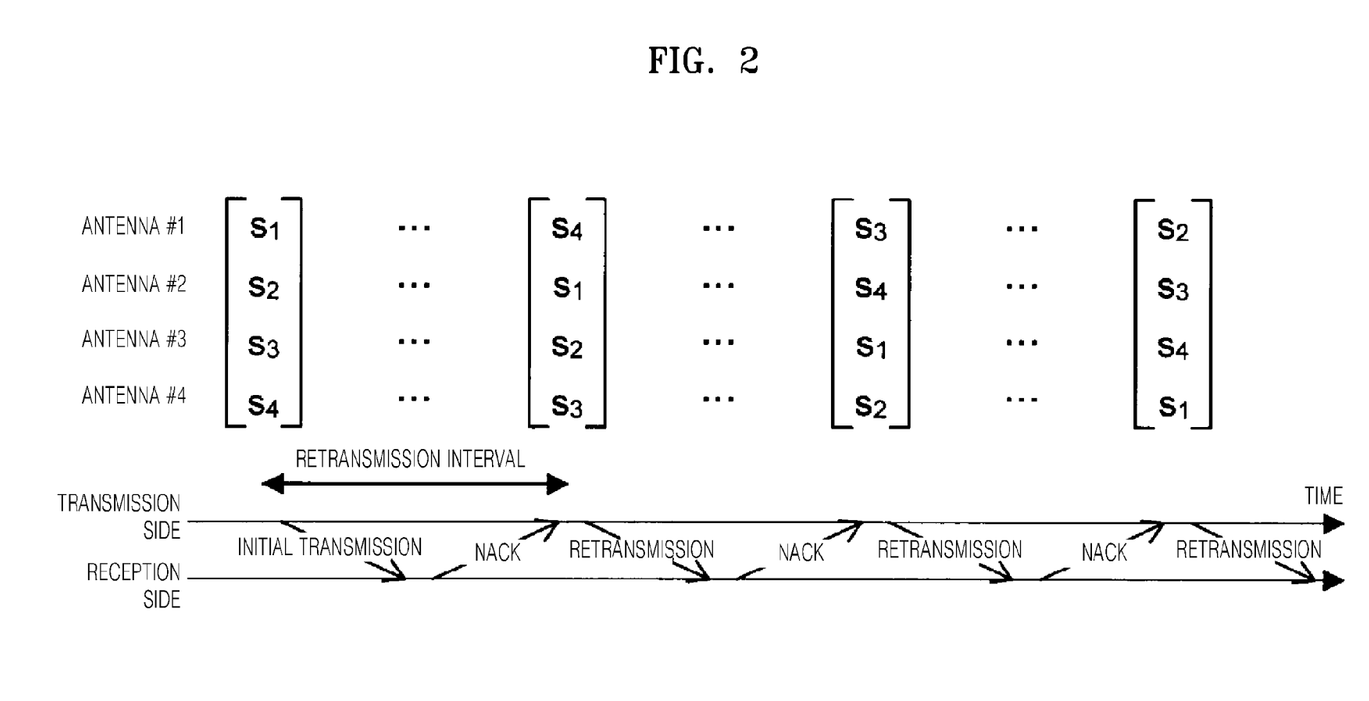
FIG. 2 is a view explaining a flow of automatic repeat control in the communication system illustrated in FIG. 1.

FIG. 2 shows a flow of automatic repeat control in the communication system 1. The transmitting apparatus 10 transmits a transmission symbol vector $s(=[s_1,s_2,s_3,s_4]^T)$ to the receiving apparatus 40. If an error is detected in reconstruction data (transmission data reconstructed from the transmission symbol vector s), the receiving apparatus 40 feeds a NACK signal to the transmitting apparatus 10. The transmitting apparatus 10 then performs cyclic shift on transmission symbols allocated to transmission antennas through the antenna cyclic shifting units 20 and retransmits a transmission symbol vector $s(=[s_4,s_1,s_2,s_3]^T)$. Each time an error is detected from reconstruction data, packet retransmission between the transmitting apparatus 10 and the receiving apparatus 40 is repeated.

If an error is detected from reconstruction data, the receiving apparatus 40 feeds a NACK signal to the transmitting apparatus 10. The transmitting apparatus 10 performs cyclic shift on the antennas at retransmission intervals in order to change an antenna to which each retransmission symbol is to be allocated. Thus, a retransmitted packet originates from a different antenna than an antenna that has transmitted the same packet. As a result, the retransmitted packet and the previously transmitted packet that is the same as the retransmitted packet obtain different channel gains and the receiving apparatus 40 combines those packets, thereby obtaining a diversity effect through antenna switchover.

II. Combining and Quantizing Channel Vectors

A process of combining and quantizing channel vectors will be described with reference to FIGS. 3 and 4. By combining and quantizing a plurality of channel vectors according to the process, the precision of quantization can be improved without increasing the number of quantization bits.

Figure 3:
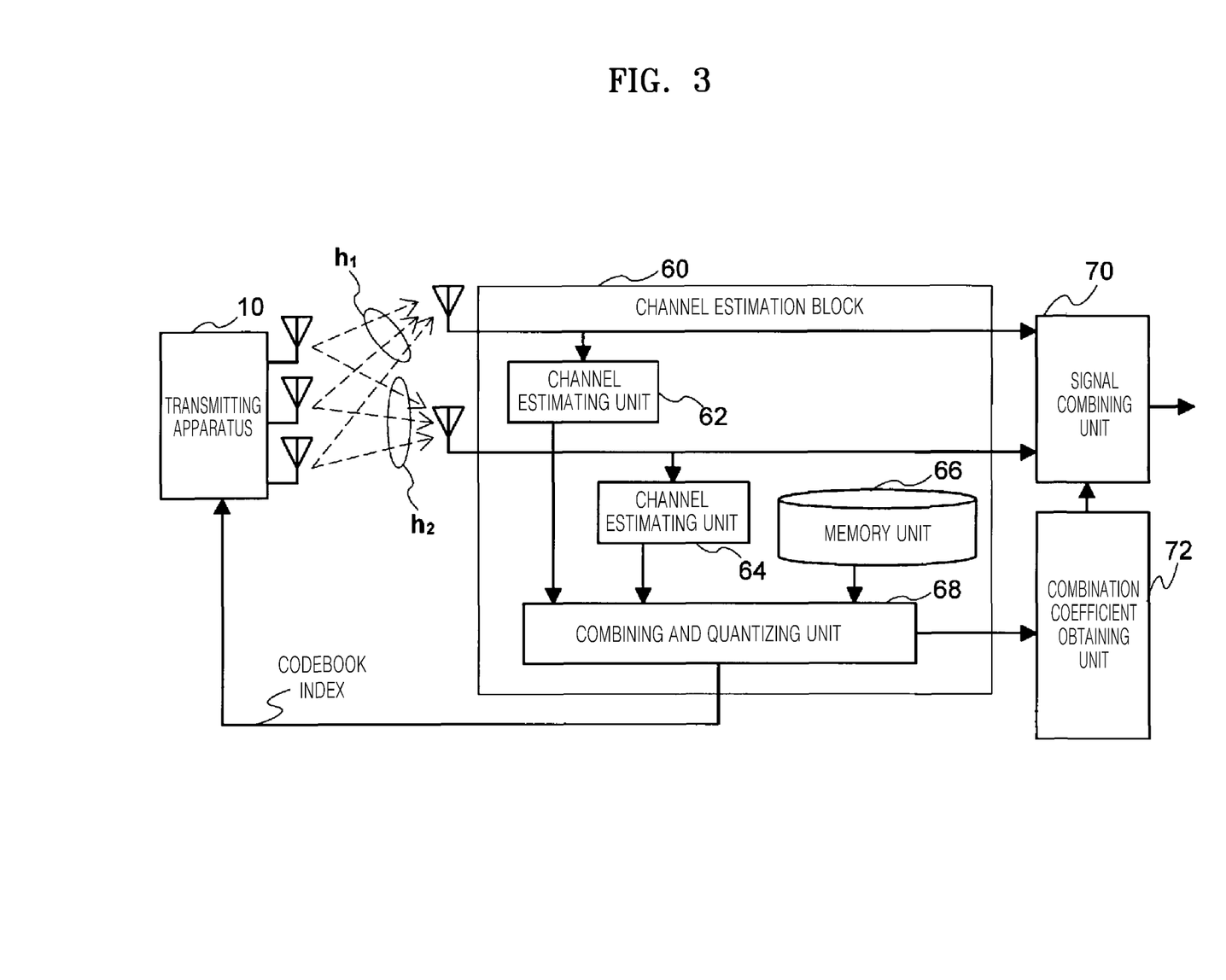
FIG. 3 is a block diagram of a receiving apparatus including a unit to combine and quantize a plurality of channel vectors.

Referring to FIG. 3, the receiving apparatus 60 includes a channel estimation block, a signal combining unit 70, and a combination coefficient obtaining unit 72. The channel estimation block includes channel estimating units 62 and 64, a memory unit 66, and a combining and quantizing unit 68.

The channel estimating unit 62 estimates a channel vector $h_1 (=[h_{11},h_{12},h_{13}]^T)$ having a vector component corresponding to each antenna of the transmitting apparatus 10 based on a signal received via a first antenna. Likewise, the channel estimating unit 64 estimates a channel vector $h_2 (=[h_{21},h_{22},h_{23}]^T)$ having a vector component corresponding to each antenna of the transmitting apparatus 10 based on a signal received via a second antenna that is different from the first antenna. The channel vectors $h_1$ and $h_2$ estimated by the channel estimating units 62 and 64 are input to the combining and quantizing unit 68.

The combining and quantizing unit 68 combines the estimated channel vectors $h_1$ and $h_2$ in order to generate a combination channel vector h' that can be expressed as follows:

$$h' = [a \ b]\begin{bmatrix} h_{11} & h_{12} & h_{13} \\ h_{21} & h_{22} & h_{23} \end{bmatrix}, \quad (1)$$

where a and b are combination coefficients. The combining and quantizing unit 68 selects a quantization vector that is suitable for the combination channel vector h' by referring to a quantization codebook recorded in the memory unit 66, and feeds an index of the quantization vector to the transmitting apparatus 10. For example, as shown in FIG. 4, the combining and quantizing unit 68 may select a quantization vector $q(=[q_1,q_2,q_3]^T)$ that minimizes an angle difference between itself and the combination channel vector h'.

Figure 4:
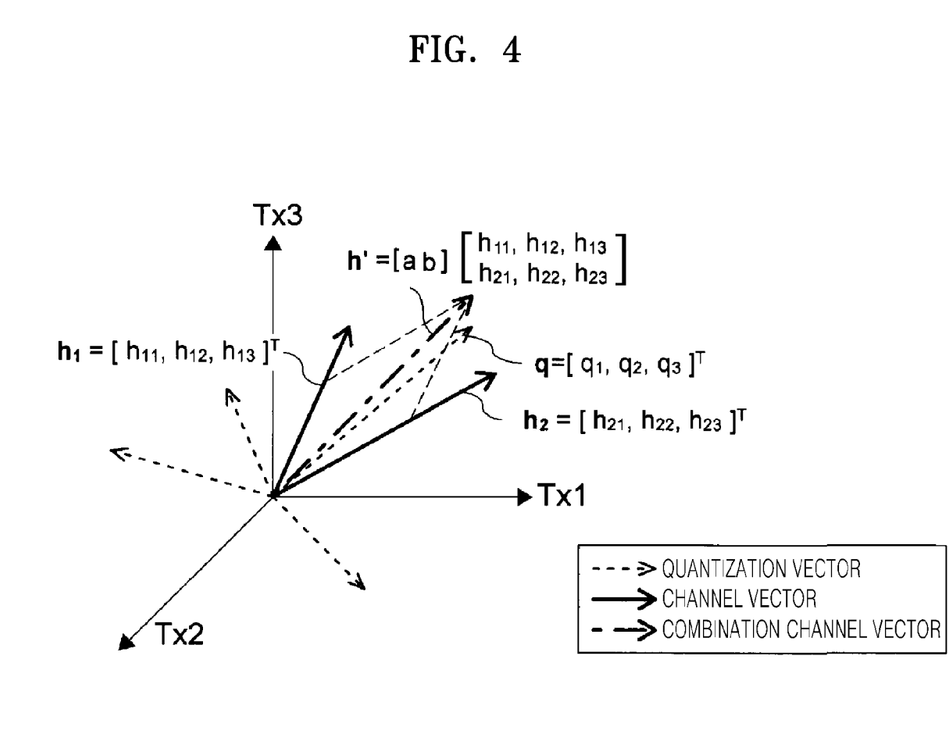
FIG. 4 illustrates a process of combining and quantizing channel vectors, which is executed by a combining and quantizing unit illustrated in FIG. 3, by way of example.

In FIG. 4, 3 axes corresponding to each antenna of the transmitting apparatus 10 are established, and a plurality of quantization vectors, the channel vectors $h_1$ and $h_2$ estimated by the channel estimating units 62 and 64, and the combination channel vector h' thereof, are expressed in a space defined by the 3 axes. As shown in FIG. 4, the combining and quantizing unit 68 selects the quantization vector q that minimizes an angle difference between itself and the combination channel vector h'. The combining and quantizing unit 68 may determine the combination coefficients a and b so that the combination channel vector h' can approximate to the quantization vector q. To combine the channel vectors $h_1$ and $h_2$, one of several methods may be used, such as a selective combining method, a maximum ratio combining method, or a quantization error minimization combining method.

The combination coefficient obtaining unit 72 obtains the combination coefficients a and b determined by the combining and quantizing unit 68 and inputs the obtained combination coefficients a and b to the signal combining unit 70. The combination coefficients a and b may also be calculated by the combination coefficient obtaining unit 72 based on information of the quantization vector q selected by the combining and quantizing unit 68 and information of the channel vectors $h_1$ and $h_2$. The combining and quantizing unit 68 may determine the quantization vector q based on a combination channel vector obtained by merely combining the channel vectors $h_1$ and $h_2$.

Using such a combining and quantizing process, an angle difference between the combination channel vector h' and the quantization vector q can be adjusted by the combination coefficients a and b, thereby improving the precision of quantization without increasing the number of quantization bits. In addition, when the receiving apparatus 60 receives a beamformed transmission signal based on a feedback quantization vector index, the receiving apparatus 60 multiplies a signal received via each antenna by the combination coefficients a and b, and then combines received signals through the signal combining unit 70.

Using the combining and quantizing process, information about a sub-channel matrix used for beamforming can be fed back to the transmitting apparatus 10 using a small number of feedback bits. The structure of a multi-user MIMO communication system 1000 capable of obtaining multiple gains using a plurality of antennas while reducing the amount of feedback information will be described as an application of the combining and quantizing process.

III. Structure of the Communication System 1000

Figure 5:
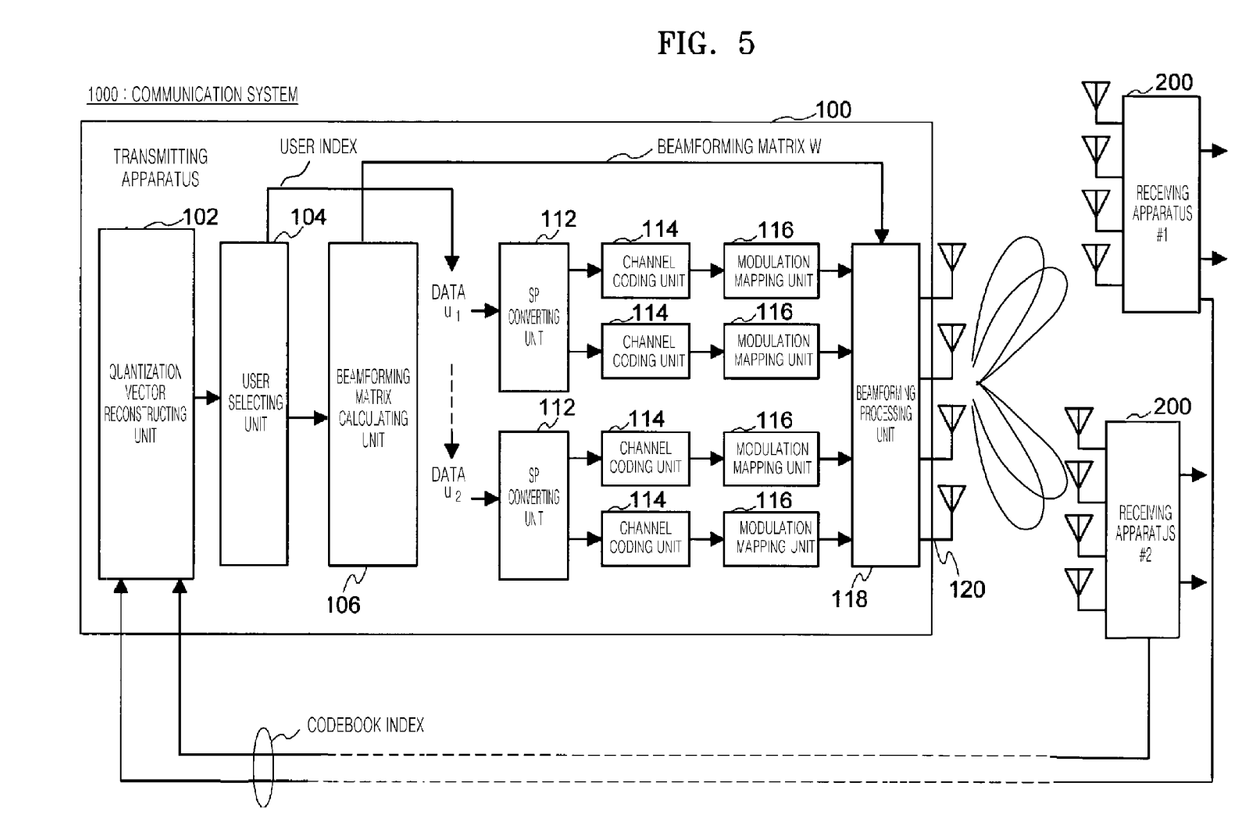
FIG. 5 is a block diagram of a transmitting apparatus using the combining and quantizing process.
Figure 6:
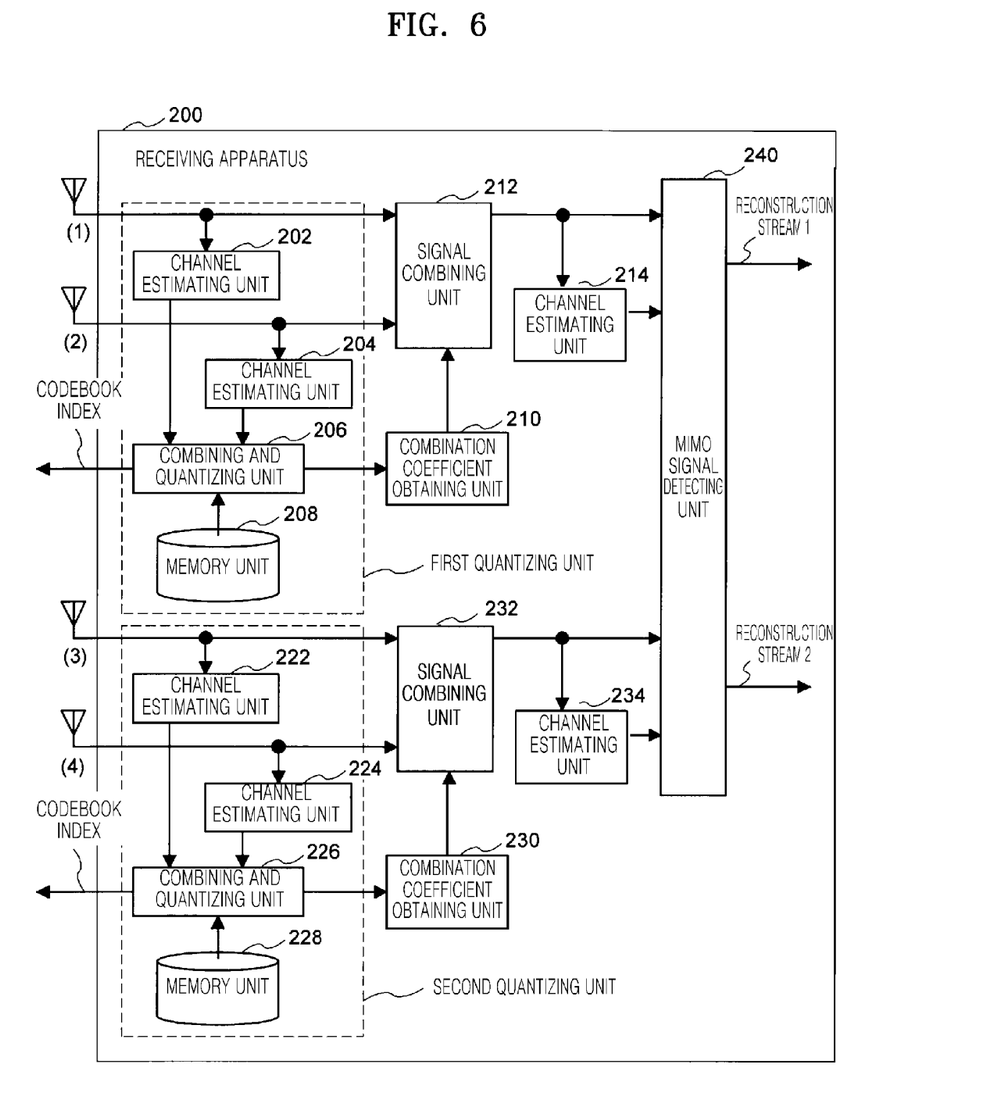
FIG. 6 is a block diagram of a receiving apparatus using the combining and quantizing process.

FIG. 5 shows the structure of the communication system 1000 and the structure of a transmitting apparatus 100 included in the communication system 1000. FIG. 6 is a block diagram of receiving apparatuses 200 #1 and #2 included in the communication system 1000.

1. Structure of the Transmitting Apparatus 100

Although the number of antennas for the transmitting apparatus 100 is 4 and the number of antennas for each of the receiving apparatuses 200 is 4 in FIG. 5, this example is not limiting. In addition, the number of antennas for the receiving apparatus 200 #1 may be different from that for the receiving apparatus 200 #2. Since each of the receiving apparatuses 200 shown in FIG. 5 uses 2 antennas for antenna combination, the number of streams transmitted to each of the receiving apparatuses 200 is 2.

Referring to FIG. 5, the transmitting apparatus 100 includes a quantization vector reconstructing unit 102, a user selecting unit 104, a beamforming matrix calculating unit 106, serial-parallel (SP) converting units 112, channel coding units 114, modulation mapping units 116, a beamforming processing unit 118, and a plurality of antennas 120. The transmitting apparatus 100 may include additional and/or different units. Similarly, the functionality of two or more of the above units may be integrated into a single component.

(1) Quantization Vector Reconstructing Unit 102

The quantization vector reconstructing unit 102 selects a quantization vector corresponding to a channel vector estimated by each of the receiving apparatuses 200 based on a quantization vector index fed back by each of the receiving apparatuses 200 by referring to a quantization codebook. The quantization vector reconstructing unit 102 inputs the selected quantization vector to the user selecting unit 104.

(2) User Selecting Unit 104

Based on quantization vectors q(#1) and q(#2) corresponding to the receiving apparatuses 200 #1 and #2, which are input from the quantization vector reconstructing unit 102, the user selecting unit 104 selects a combination of receiving apparatuses as a destination to which signals are simultaneously transmitted in such a way to provide maximum channel capacity after beamforming. The user selecting unit 104 notifies the beamforming matrix calculating unit 106 of the selected combination of receiving apparatuses by using a user index indicating each of the receiving apparatuses. The transmitting apparatus 100 also determines data $u_1$ and data $u_2$ to be allocated to each stream according to the selected combination of receiving apparatuses, i.e., a combination of user indices, and inputs the determined data $u_1$ and data $u_2$ to the SP converting units 112.

The SP converting units 112 perform serial-parallel conversion on the input data for each stream in order to allocate the converted data to a plurality of sub-streams and inputs the resulting data to the channel coding units 114. The channel coding units 114 perform channel coding on the input data for each sub-stream in order to input the channel-coded data to the modulating mapping units 116. The modulation mapping units 116 perform modulation mapping on the channel-coded data for each sub-stream with a predetermined modulation degree, determine a transmission symbol for each sub-stream, and input the determined transmission symbol for each sub-stream to the beamforming processing unit 118.

(3) Beamforming Matrix Calculating Unit 106

The beamforming matrix calculating unit 106 calculates a beamforming matrix based on a sub-channel fed back from each of the receiving apparatuses 200. When the combination of receiving apparatuses selected by the user selecting unit 104 includes the receiving apparatus 200 #1 and the receiving apparatus #2, the beamforming matrix calculating unit 106 generates a channel matrix H regarding the selected receiving apparatuses 200 #1 and #2 using a channel matrix $H_1$ fed back from the receiving apparatus 200 #1 and a channel matrix $H_2$ fed back from the receiving apparatus 200 #2. A superscript H is a symbol indicating a Hermitian operation.

$$H_1 = \begin{bmatrix} h_{11} & h_{12} & h_{13} & h_{14} \\ h_{21} & h_{22} & h_{23} & h_{24} \end{bmatrix} \quad (1)$$

$$H_2 = \begin{bmatrix} h_{31} & h_{32} & h_{33} & h_{34} \\ h_{41} & h_{42} & h_{43} & h_{44} \end{bmatrix} \quad (2)$$

$$H = \lfloor H_1^T \ H_2^T \rfloor \quad (3)$$

$$= \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

The beamforming matrix calculating unit 106 calculates a beamforming matrix W by calculating an inverse matrix of the channel matrix fed from each of the receiving apparatuses 200. The beamforming matrix W is used to enable each of the receiving apparatuses 200 to receive a target signal by applying a weight value according to a channel state in the case of signal transmission using a plurality of antennas. A superscript H is a symbol indicating a Hermitian operation.

$$W = H^H (HH^H)^{-1} \quad (4)$$

The beamforming processing unit 118 applies the beamforming matrix W calculated by the beamforming matrix calculating unit 106 to a transmission symbol and transmits the transmission symbol to the receiving apparatuses 200.

2. Structure of the Receiving Apparatus 200

Referring to FIG. 6, the receiving apparatus 200 includes channel estimating units 202, 204, 214, 222, 224, and 234, combining and quantizing units 206 and 226, memory units 208 and 228, combination coefficient obtaining units 210 and 230, signal combining units 212 and 232, a MIMO signal detecting unit 240, and a plurality of antennas 1 through 4.

(1) Channel Estimating Units 202 and 204

The channel estimating unit 202 estimates a channel vector $h_1 (=[h_{11},h_{12},h_{13},h_{14}]^T)$ having a vector component corresponding to each antenna of the transmitting apparatus 100 based on a signal received via an antenna 1. Likewise, the channel estimating unit 204 estimates a channel vector $h_2 (=[h_{21},h_{22},h_{23},h_{24}]^T)$ having a vector component corresponding to each antenna of the transmitting apparatus 100 based on a signal received via antenna 2. The channel estimating units 202 and 204 inputs the estimated channel vectors h and $h_2$ to the combining and synthesizing unit 206.

(2) Combining and Quantizing Unit 206

The combining and quantizing unit 206 combines the estimated channel vectors h and $h_2$ in order to generate a combination channel vector $h_1'$ as follows:

$$h_1' = [a_1 \ b_1]\begin{bmatrix} h_{11} & h_{12} & h_{13} & h_{14} \\ h_{21} & h_{22} & h_{23} & h_{24} \end{bmatrix} \quad (5)$$

$$= [\ a_1 \times h_{11} + b_1 \times h_{21} \quad a_1 \times h_{12} + b_1 \times h_{22}$$

$$a_1 \times h_{13} + b_1 \times h_{23} \quad a_1 \times h_{14} + b_1 \times h_{24}\ ],$$

where $a_1$ and $b_1$ are combination coefficients. The combining and quantizing unit 206 selects a quantization vector that is suitable for the combination channel vector $h_1'$ by referring to a quantization codebook recorded in the memory unit 208 and feeds an index of the quantization vector to the transmitting apparatus 100. For example, the combining and quantizing unit 206 selects a quantization vector $q_1 (=[q_{11},q_{12},q_{13},q_{14}]^T)$ that minimizes an angle difference between the quantization vector $q_1$ and the combination channel vector $h_1'$. To combine the channel vectors $h_1$ and $h_2$, one of several methods may be used, such as a selective combining method, a maximum ratio combining method, or a quantization error minimization combining method.

(3) Channel Estimating Units 222 and 224

The channel estimating unit 222 estimates a channel vector $h_3 (=[h_{31},h_{32},h_{33},h_{34}]^T)$ having a vector component corresponding to each antenna of the transmitting apparatus 100 based on a signal received via an antenna 3. Likewise, the channel estimating unit 224 estimates a channel vector $h_4 (=[h_{41},h_{42},h_{43},h_{44}]^T)$ having a vector component corresponding to each antenna of the transmitting apparatus 100 based on a signal received via an antenna 4. The channel vectors $h_3$ and $h_4$ estimated by the channel estimating units 222 and 224 are input to the combining and quantizing unit 226.

(4) Combining and Quantizing Unit 226

The combining and quantizing unit 226 combines the estimated channel vectors $h_3$ and $h_4$ in order to generate a combination channel vector $h_2'$ as follows:

$$h_2' = [a_2 \ b_2]\begin{bmatrix} h_{31} & h_{32} & h_{33} & h_{34} \\ h_{41} & h_{42} & h_{43} & h_{44} \end{bmatrix} \quad (6)$$

$$= [\ a_2 \times h_{31} + b_2 \times h_{41} \quad a_2 \times h_{32} + b_2 \times h_{42}$$

$$a_2 \times h_{33} + b_2 \times h_{43} \quad a_2 \times h_{34} + b_2 \times h_{44}\ ],$$

where $a_2$ and $b_2$ are combination coefficients. The combining and quantizing unit 226 selects a quantization vector that is suitable for the combination channel vector $h_2'$ by referring to a quantization codebook recorded in the memory unit 228, and feeds an index of the quantization vector to the transmitting apparatus 100. For example, the combining and quantizing unit 226 selects a quantization vector $q_2 (=[q_{21},q_{22},q_{23},$ $q_{24}]^T$) that minimizes an angle difference between the quantization vector $q_2$ and the combination channel vector $h_2'$.

A plurality of channel vectors estimated based on signals received via a plurality of antennas are combined and quantized separately as a plurality of groups. The receiving apparatus 200 may includes the separate combining and quantizing units 206 and 226 shown in FIG. 6. As a result, the plurality of channel vectors are fed back to the transmitting apparatus 100 and thus the transmitting apparatus 100 can transmit a plurality of streams based on the fed back channel vectors. A description will now be made regarding an MIMO signal detection unit to separate the plurality of streams.

(5) Combination Coefficient Obtaining Units 210 and 230

The combination coefficient obtaining unit 210 obtains the combination coefficients $a_1$ and $b_1$ to be multiplied by the plurality of channel vectors $h_1$ and $h_2$ so that an angle difference between the quantization vector $q_1$ selected by the combining and quantizing unit 206 and the combination channel vector $h_1'$ of the channel vectors $h_1$ and $h_2$ can be reduced. The combination coefficient obtaining unit 210 may also calculate the combination coefficients $a_1$ and $b_1$ based on information of the channel vectors $h_1$ and $h_2$ and information of the selected quantization vector $q_1$. The combination coefficient obtaining unit 210 inputs information of the obtained combination coefficients $a_1$ and $b_1$ to the signal combining unit 212.

Likewise, the combination coefficient obtaining unit 230 obtains the combination coefficients $a_2$ and $b_2$ to be multiplied by the plurality of channel vectors $h_3$ and $h_4$ so that an angle difference between the quantization vector $q_2$ selected by the combining and quantizing unit 206 and the combination channel vector $h_2'$ of the channel vectors $h_3$ and $h_4$ can be reduced. The combination coefficient obtaining unit 230 may also calculate the combination coefficients $a_2$ and $b_2$ based on information of the channel vectors $h_3$ and $h_4$ and information of the selected quantization vector $q_2$. The combination coefficient obtaining unit 230 inputs information of the obtained combination coefficients $a_2$ and $b_2$ to the signal combining unit 232.

(6) Signal Combining Units 212 and 232

The signal combining unit 212 combines a plurality of reception signals $r_1$ and $r_2$ received via the plurality of antennas 1 and 2 corresponding to the combining and quantizing unit 206. The signal combining unit 212 multiplies the reception signals $r_1$ and $r_2$ by the combination coefficients $a_1$ and $b_1$ input from the combination coefficient obtaining unit 210 before combining the reception signals $r_1$ and $r_2$. For example, the signal combining unit 212 multiplies the reception signal $r_1$ received via the antenna 1 by the combination coefficient $a_1$ and multiplies the reception signal $r_2$ received via the antenna 2 by the combination coefficient $b_1$. The signal combining unit 212 combines the reception signals $r_1$ and $r_2$ multiplied by the combination coefficients $a_1$ and $b_1$, thereby generating a combination signal $R_1 (=a_1 \times r_1 + b_1 \times r_2)$.

Likewise, the signal combining unit 232 combines a plurality of reception signals $r_3$ and $r_4$ received via the plurality of antennas 3 and 4 corresponding to the combining and quantizing unit 226. The signal combining unit 232 multiplies the reception signals $r_3$ and $r_4$ by the combination coefficients $a_2$ and $b_2$ input from the combination coefficient obtaining unit 230 before combining the reception signals $r_3$ and $r_4$. For example, the signal combining unit 232 multiplies the reception signal $r_3$ received via the antenna 3 by the combination coefficient $a_2$ and multiplies the reception signal $r_4$ received via the antenna 4 by the combination coefficient $b_2$. The signal combining unit 232 combines the reception signals $r_3$ and $r_4$ multiplied by the combination coefficients $a_2$ and $b_2$, thereby generating a combination signal $R_2 (=a_2 \times r_3 + b_2 \times r_4)$.

(7) Channel Estimating Units 214 and 234

The channel estimating unit 214 estimates the channel vector $h_1'(=[h_{11}',h_{12}',h_{13}',h_{14}']^T)$ having a vector component corresponding to each antenna of the transmitting apparatus 100 based on the combination signal $R_1$ generated by the signal combining unit 212. Likewise, the channel estimating unit 234 estimates the channel vector $h_2'(=[h_{21}',h_{22}',h_{23},h_{24}]^T)$ having a vector component corresponding to each antenna of the transmitting apparatus 100 based on the combination signal $R_2$ generated by the signal combining unit 232. The channel vectors $h_1'$ and $h_2'$ estimated by the channel estimating unit 214 and the channel estimating unit 234 are input to the MIMO signal detecting unit 240.

(8) MIMO Signal Detecting Unit 240

The MIMO signal detecting unit 240 separates a reception signal for each stream based on the combination signals $R_1$ and $R_2$ input by the signal combining units 212 and 232 and the channel vectors $h_1'$ and $h_2'$ corresponding to the combination signals $R_1$ and $R_2$, and reconstructs a transmission symbol of each stream. For example, the MIMO signal detecting unit 240 may separate a reception signal for each stream using one of several signal separating algorithms, such as a minimum mean squared error (MMSE) detection scheme or a maximum likelihood detection (MLD) scheme.

The structure of the receiving apparatus 200 has been described so far. According to this structure, a plurality of channel vectors are combined and quantized, thereby improving the precision of quantization of the channel vectors. Moreover, a plurality of stream signals can be received from the transmitting apparatus 100 due to a plurality of combining and quantizing units, thereby obtaining multiple gains between streams. By applying the MLD scheme to the MIMO signal detecting unit 240, superior transmission characteristics can also be obtained.

However, in the communication system 1000, the transmitting apparatus 100 multiplies each transmission stream by a weight vector and transmits the stream via all antennas. As a result, it is impossible to change allocation of a sub-stream to each antenna. Consequently, only the same channel gain as a previous one can be obtained when a packet is retransmitted in response to a NACK signal. Thus, the effect of the hybrid ARQ scheme cannot be sufficiently exerted.

Embodiment of the Present Invention

Figure 7:
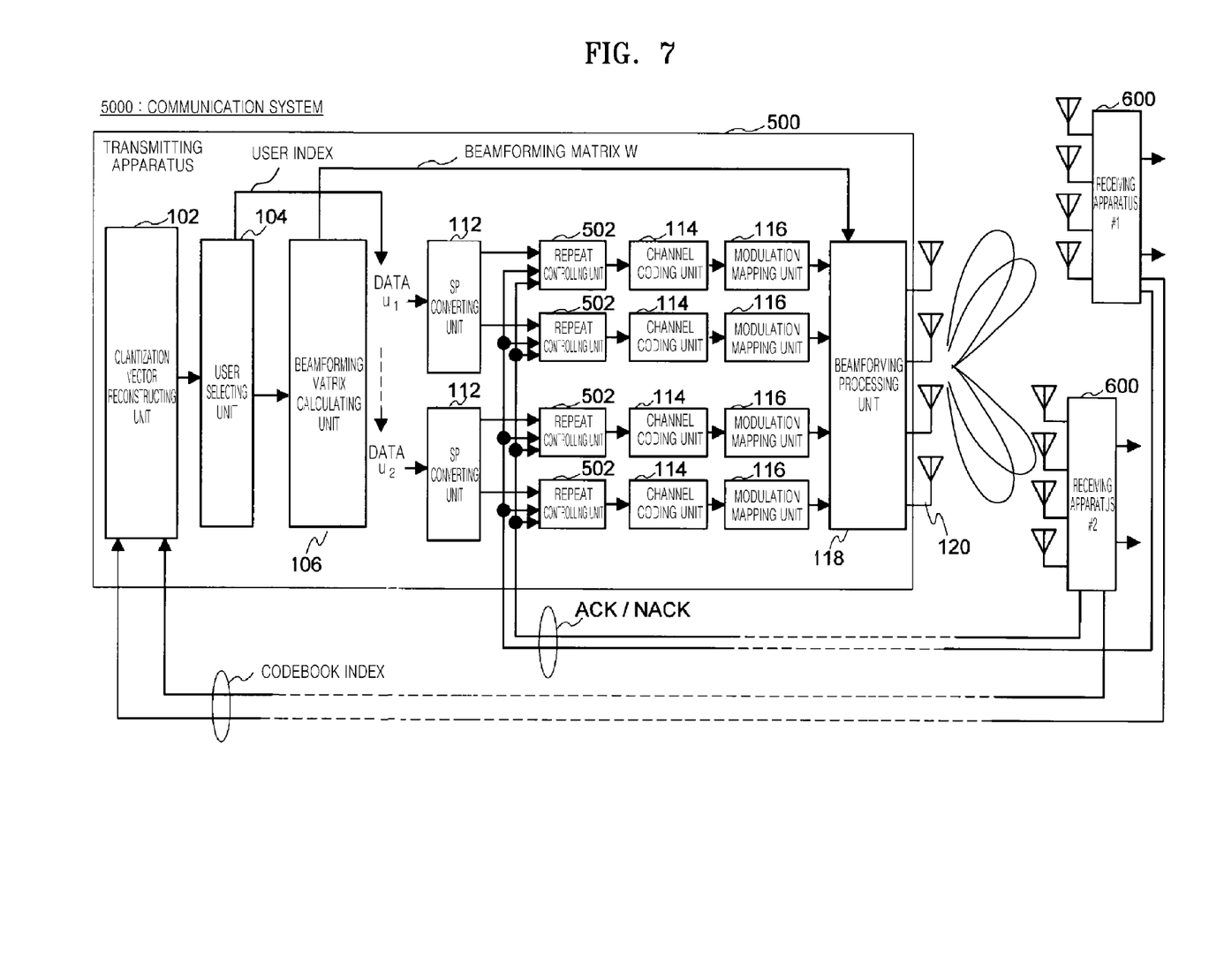
FIG. 7 is a block diagram of a transmitting apparatus according to an embodiment of the present invention.

Hereinafter, the structure of a communication system 5000 according to an embodiment of the present invention will be described. As shown in FIG. 7, the communication system 5000 includes a transmitting apparatus 500 and a plurality of receiving apparatuses 600. The structures of the transmitting apparatus 500 and the receiving apparatuses 600 will now be described in detail.

1. Structure of the Transmitting Apparatus 500

FIG. 7 shows the structure of the transmitting apparatus 500 according to an embodiment of the present invention. The structure of the transmitting apparatus 500 will be described with reference to FIG. 7. However, components that are substantially the same as those of the transmitting apparatus 100 included in the communication system 1000 will be indicated by the same reference numerals as those used in FIG. 5 and will not be described in detail.

Referring to FIG. 7, the transmitting apparatus 500 includes a quantization vector reconstructing unit 102, a user selecting unit 104, a beamforming matrix calculating unit 106, SP converting units 112, repeat controlling units 502, channel coding units 114, modulation mapping units 116, a beamforming processing unit 118, and a plurality of antennas 120. One difference between the transmitting apparatus 500 and the transmitting apparatus 100 is the structure of the repeat controlling units 502. Thus, a description of the transmitting apparatus 500 will focus on the repeat controlling units 502.

(1) Repeat Controlling Units 502

Each of the repeat controlling units 502 determine whether to perform repeat control according to an ACK signal or a NACK signal fed back from each of the receiving apparatuses 600 and performs repeat control if necessary. For example, upon receipt of a NACK signal from the receiving apparatus 600, the repeat controlling unit 502 inputs transmission data corresponding to retransmission data having an error detected by the receiving apparatus 600 back to the channel coding unit 114. On the other hand, upon receipt of an ACK signal from the receiving apparatus 600, the repeat controlling unit 502 inputs new transmission data input from the SP converting unit 112 to the channel coding unit 114.

Repeat control is implemented using the repeat controlling units 502. However, in the communication system 5000, each time an error is detected from reconstruction data by the receiving apparatus 600, different codebook indices are fed back to the transmitting apparatus 500. Thus, different beamforming matrices are generated in the transmitting apparatus 500 at each repeat control and thus a retransmission packet can obtain a channel gain that is different from that of a previously transmitted packet that is the same as the retransmission packet.

2. Structure of the Receiving Apparatus 600

Figure 8:
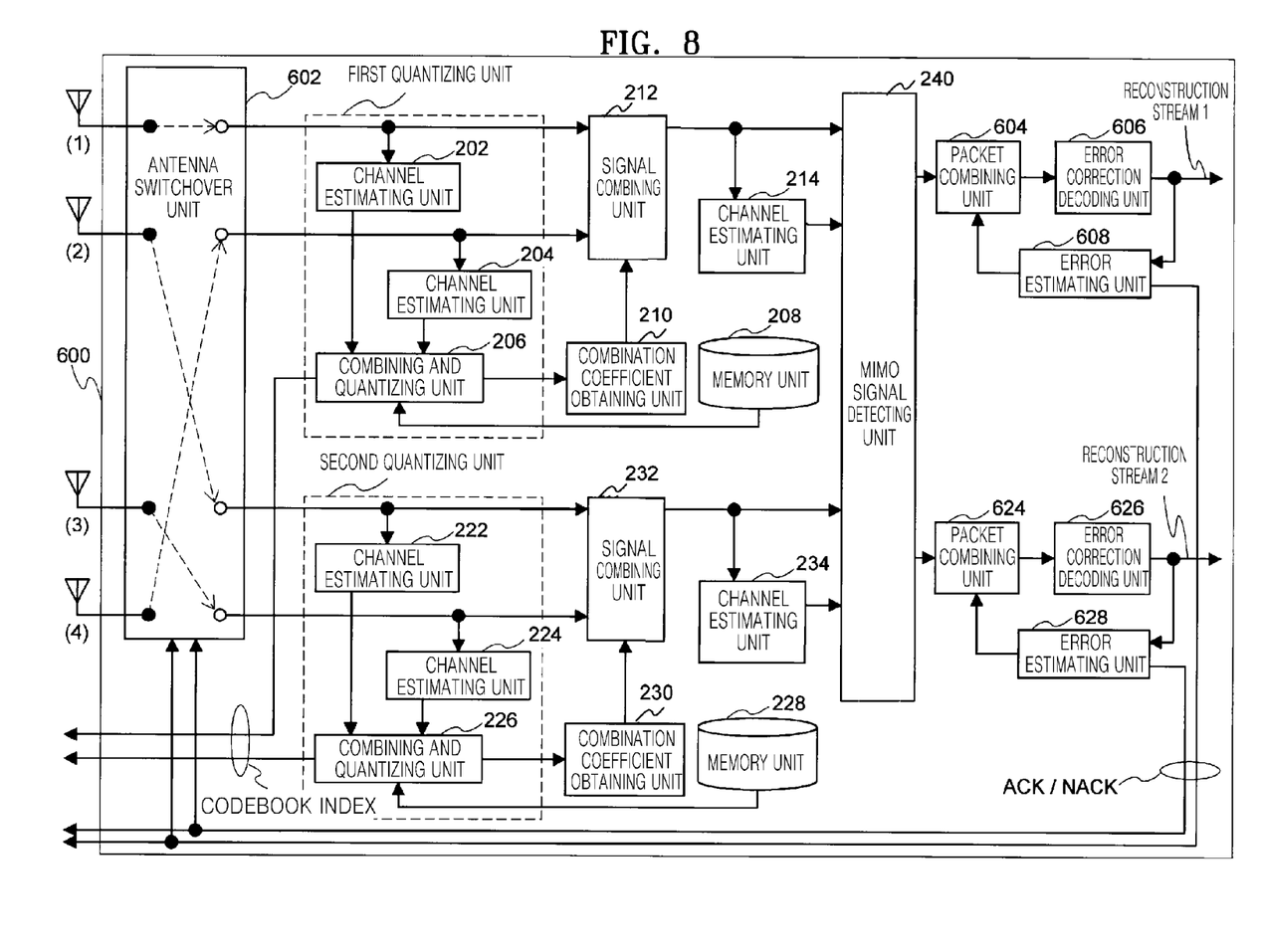
FIG. 8 is a block diagram of a receiving apparatus according to an embodiment of the present invention.

FIG. 8 shows the structure of the receiving apparatus 600 according to an embodiment of the present invention. Components that are substantially the same as those of the receiving apparatus 200 will be indicated by the same reference numerals as those used in FIG. 6 and will not be described in detail.

Referring to FIG. 8, the receiving apparatus 600 includes an antenna switchover unit 602, channel estimating units 202, 204, 214, 222, 224, and 234, combining and quantizing units 206 and 226, memory units 208 and 228, combination coefficient obtaining units 210 and 230, signal combining units 212 and 232, a MIMO signal detecting unit 240, packet combining units 604 and 624, error correction decoding units 606 and 626, and error detecting units 608 and 628. According to other aspects of the present invention, the receiving apparatus 600 may include additional and/or different units. Similarly, the functionality of two or more of the above units may be integrated into a single component. Key differences between the receiving apparatus 600 and the receiving apparatus 200 include the antenna switchover unit 602, the packet combining units 604 and 624, the error correction decoding units 606 and 626, and the error detecting units 608 and 628. Thus, a description of the receiving apparatus 600 will focus on such components.

(1) Antenna Switchover Unit 602

The antenna switchover unit 602 switches over a combination of antennas 1 through 4 in response to a NACK signal notified by the error detecting units 608 and 628. Signals received via the antenna 1 and the antenna 4 are input to a first quantizing unit and signals received via the antenna 2 and the antenna 3 are input to a second combining unit. The antenna switchover unit 602 switches over a combination of antennas corresponding to each of the first and second quantizing units.

Figure 9:
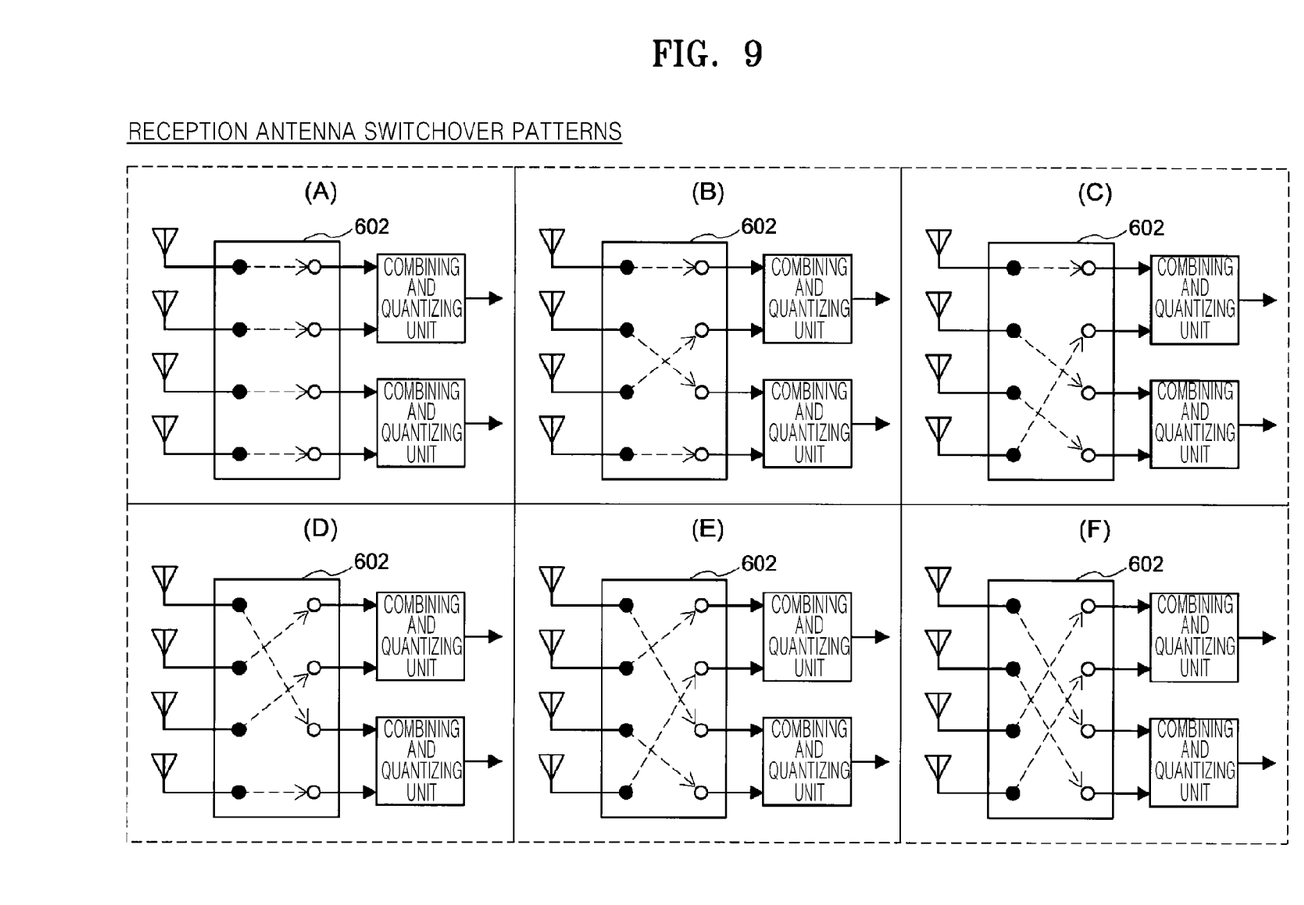
FIG. 9 illustrates combinations of antennas, which are obtained by an antenna switchover unit illustrated in FIG. 8, by way of example.

When the number of reception antennas is 4 and the number of combining and quantizing units is 2, 6 combinations, each including 2 elements, can be made from 4 elements. Thus, 6 switchover patterns exist as shown in (A) through (F) of FIG. 9. For example, the antenna switchover unit 602 switches over connections between each reception antenna and the channel estimating units 202, 204, 222, and 224 so that the 6 switchover patterns can be used in turn. An order in which the patterns are used can be set at random. Even when the number of reception antennas is greater than 4 and the number of combining and quantizing units is greater than 2, the antenna switchover unit 602 may operate such that corresponding switchover patterns can be used in turn. The number of combinations will vary depending on the number of antennas.

(2) Packet Combining Units 604 and 624

Referring again to FIG. 8, the packet combining unit 604 combines a retransmission packet that is retransmitted in response to a NACK signal notified by the error detecting unit 608 with a previously transmitted packet that is the same as the retransmission packet. The packet combining unit 604 combines the retransmission packet and the previously transmitted packet with a transmission signal for each stream detected by the MIMO signal detecting unit 240 based on a combination signal generated by the signal combining unit 212 and a channel vector estimated by the channel estimating unit 214. When repeat control is repeatedly performed, the packet combining unit 604 combines the retransmission packet with a plurality of previously transmitted packets that are the same as the retransmission packet.

Likewise, the packet combining unit 624 combines the retransmission packet and the previously transmitted packet with a transmission signal for each stream detected by the MIMO signal detecting unit 240 based on a combination signal generated by the signal combining unit 232 and a channel vector estimated by the channel estimating unit 234. The packet combining units 604 and 624 inputs generated combination packets to the error correction decoding units 606 and 626.

(3) Error Correction Decoding Units 606 and 626

The error correction decoding unit 606 reconstructs transmission data for each stream, which will hereinafter be referred to as a reconstruction stream, by performing error correction decoding on the combination packet generated by the packet combining unit 604. Likewise, the error correction decoding unit 626 reconstructs a reconstruction stream by performing error correction decoding on the combination packet generated by the packet combining unit 624. The error correction decoding units 606 and 626 input the reconstruction streams to the error detecting units 608 and 628.

(4) Error Detecting Units 608 and 628

The error detecting unit 608 performs error detection on the reconstruction stream decoded by the error correction decoding unit 606 based on an error detection code. Likewise, the error detecting unit 628 performs error detection on the reconstruction stream decoded by the error correction decoding unit 626 based on the error detection code. When an error is detected from the reconstruction stream, the error detecting units 608 and 628 feed a NACK signal back to the transmitting apparatus 500 and notify the antenna switchover unit 602 and the packet combining units 604 and 624 of the NACK signal. If no error is detected from the reconstruction stream, the error detecting units 608 and 628 feed an ACK signal back to the transmitting apparatus 500 and notify the antenna switchover unit 602 and the packet combining units 604 and 624 of the ACK signal.

Upon notification of the NACK signal, the antenna switchover unit 602 switches over a combination of reception antennas and the channel estimating units 204 and 224 and the combining and quantizing units 206 and 226 select a new codebook index. The new codebook index is fed back to the transmitting apparatus 500, and the transmitting apparatus 500 retransmits a transmission signal on which beamforming is performed using a new beamforming matrix calculated based on the codebook index. Feedback and transmission timings associated with automatic repeat control are shown in FIG. 10.

Figure 10:
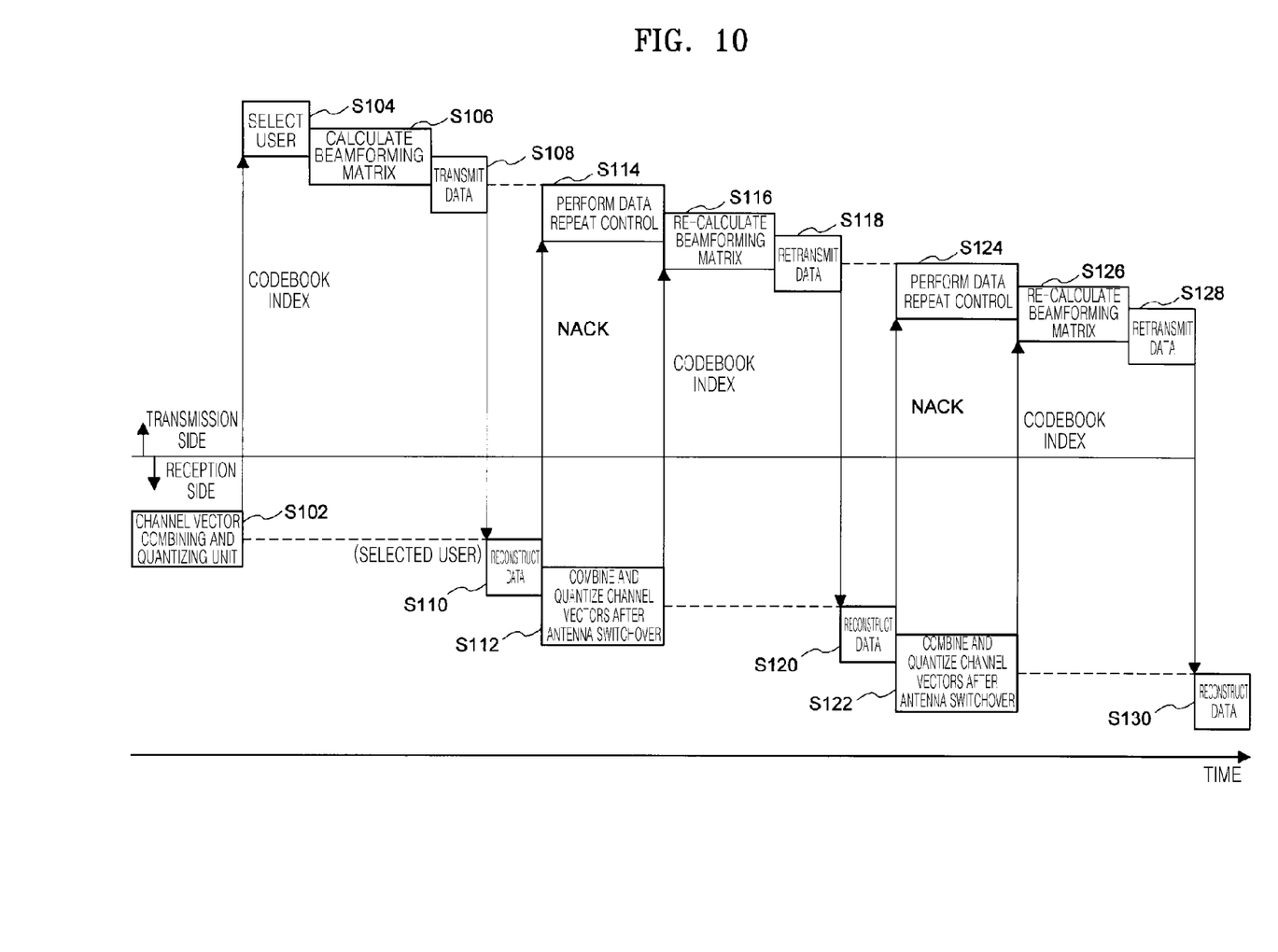
FIG. 10 illustrates feedback and transmission timings associated with automatic repeat control according to an embodiment of the present invention.

As shown in FIG. 10, the receiving apparatus 600 performs combination and quantization by estimating a channel vector for each stream based on an initially transmitted pilot signal in operation S102. In operation S104, the transmitting apparatus 500 selects a combination of receiving apparatuses 600 as a destination based on a codebook index fed back from the receiving apparatus 600 so that channel capacity after beamforming can be increased. The transmitting apparatus 500 calculates a beamforming matrix in operation S106 and transmits a transmission signal, which has undergone beamforming, towards the selected combination of receiving apparatuses 600 in operation S108.

The receiving apparatus 600 reconstructs transmission data for each stream in operation S110 in order to perform error detection on the reconstructed transmission data. If an error is detected from the reconstructed transmission data, the receiving apparatus 600 feeds a NACK signal back to the transmitting apparatus 500. The receiving apparatus 600 switches over a combination of reception antennas in order to change a combination of channel vectors to be combined and quantized, thereby selecting a new codebook index in operation S112.

In operation S114, the transmitting apparatus 500 performs repeat control in response to the NACK signal. In operation S116, the transmitting apparatus 500 re-calculates a beamforming matrix based on the new codebook index fed back from the receiving apparatus 600. In operation S118, the transmitting apparatus 500 retransmits a transmission signal on which beamforming has been performed based on the re-calculated beamforming matrix towards the receiving apparatus 600.

In operation S120, the receiving apparatus 600 receives the retransmitted transmission signal and performs packet combination on the transmission signal, thereby reconstructing transmission data for each stream. If an error is detected from the reconstructed transmission data, the receiving apparatus 600 feeds a NACK signal back to the transmitting apparatus 500 and switches over a combination of antennas in order to select a new codebook index in operation S122 and feeds the selected codebook index back to the transmitting apparatus 500. The transmitting apparatus 500 performs repeat control on the transmission data in operation S124. The transmitting apparatus 500 then re-calculates a beamforming matrix based on a codebook index fed back from the receiving apparatus 600 in operation S126 and retransmits a transmission signal on which beamforming has been performed based on the re-calculated beamforming matrix towards the receiving apparatus 600 in operation S128. The receiving apparatus 600 then reconstructs transmission data in operation S130.

As described above, according to aspects of the present invention, in a multi-user MIMO system using zero forcing beamforming, when each receiving apparatus has 4 reception antennas or more, maximum transmission speed for each receiving apparatus can be improved while reducing the amount of feedback information. Moreover, with different channel gains between a transmission stream and a retransmitted stream, diversity effect can be obtained from hybrid ARQ. As a result, transmission characteristics or maximum throughput for each receiving apparatus can be improved.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although the number of antennas for each of a transmitting apparatus and a receiving apparatus is 4 in the descriptions of the embodiments of the present invention given above, the present invention is not limited to this example. In addition, while antennas of the receiving apparatus are divided into groups, each having the same number of antennas in the descriptions given above, the number of antennas may also vary from group to group.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A receiving apparatus comprising:
a plurality of antennas to receive signals;
a combining and quantizing unit to combine channel vectors corresponding to a combination of the plurality of antennas in order to generate a combination channel vector, and to select a predetermined quantization vector from among a plurality of quantization vectors included in the receiving apparatus according to the generated combination channel vector by referring to a quantization codebook recorded in a memory unit;
an error detecting unit to detect an error in the received signals; and
an antenna switchover unit to change the combination of the antennas according to a result of the error detection;
wherein the combining and quantizing unit feeds an index of the selected predetermined quantization vector back to a transmitting apparatus, and the selected predetermined quantization vector reduces an angle difference between the selected predetermined quantization vector and the combination channel vector.

2. The receiving apparatus of claim 1, wherein the received signals have undergone beamforming based on the predetermined quantization vector corresponding to the index fed back to the transmitting apparatus.

3. The receiving apparatus of claim 2, wherein the combining and quantizing unit combines channel vectors corresponding to the switched combination of the antennas based on the received signals in order to generate a combination channel vector and re-selects a predetermined quantization vector according to the generated combination channel vector.

4. The receiving apparatus of claim 3, wherein the combining and quantizing unit feeds an index of the re-selected predetermined quantization vector back to the transmitting apparatus.

5. The receiving apparatus of claim 3, further comprising:
a signal combining unit to combine the received signals according to the switched combination of the antennas in order to generate a combination signal; and
a signal detecting unit to detect reception signals for each stream based on a channel matrix estimated based on the generated combination signal.

6. The receiving apparatus of claim 1, wherein the receiving apparatus is a user terminal included in a multi-user multiple-input and multiple-output (MIMO) system.

7. The receiving apparatus of claim 2, further comprising a packet combining unit to combine signals detected using the error-detected signals with signals detected using signals corresponding to the error-detected signals on which beamforming has been performed, based on a predetermined quantization vector corresponding to the index fed back to the transmitting apparatus.

8. A transmitting apparatus comprising:
a repeat controlling unit to determine whether to retransmit transmission data according to a predetermined signal fed back from a receiving apparatus;
a beamforming matrix calculating unit to calculate a beamforming matrix corresponding to a channel matrix based on an index of a predetermined quantization vector fed back from the receiving apparatus according to a result of the determination by referring to a quantization codebook recorded in a memory unit; and
a beamforming unit to perform beamforming on a transmission signal using the calculated beamforming matrix and to transmit the transmission signal that has undergone the beamforming,
wherein the predetermined quantization vector is selected from among a plurality of quantization vectors included in the receiving apparatus based on a combination channel vector corresponding to a plurality of antennas, and the predetermined quantization vector reduces an angle difference between the predetermined quantization vector and the combination channel vector.

9. A receiving method for a receiving apparatus, the receiving method comprising:
receiving signals via a plurality of antennas;
combining channel vectors corresponding to a combination of the plurality of antennas in order to generate a combination channel vector;
selecting a predetermined quantization vector from among a plurality of quantization vectors included in the receiving apparatus according to the generated combination channel vector by referring to a quantization codebook recorded in a memory unit;
detecting an error in the received signals;
switching over the combination of the antennas according to a result of the error detection; and
feeding an index of the selected predetermined quantization vector back to a transmitting apparatus,
wherein the selected predetermined quantization vector reduces an angle difference between the selected predetermined quantization vector and the combination channel vector.

10. The receiving method of claim 9, wherein the signals received via the plurality of antennas have undergone beamforming based on the predetermined quantization vector corresponding to the index fed back to the transmitting apparatus.

11. The receiving method of claim 10, wherein the combination of the channel vectors and the re-selection of the predetermined quantization vector comprise: combining channel vectors corresponding to the switched combination of the antennas based on the received signals in order to generate a combination channel vector; and re-selecting a predetermined quantization vector according to the generated combination channel vector.

12. The receiving method of claim 11, wherein the feeding back of the index to the transmitting apparatus comprises feeding an index of the re-selected predetermined quantization vector back to the transmitting apparatus.

13. The receiving method of claim 11, further comprising: combining the received signals according to the switched combination of the antennas in order to generate a combination signal; and detecting reception signals for each stream based on a channel matrix estimated based on the generated combination signal.

14. The receiving method of claim 9, wherein the receiving apparatus is a user terminal included in a multi-user multiple-input and multiple-output (MIMO) system.

15. The receiving method of claim 10, further comprising combining signals detected using the error-detected signals with signals detected using signals corresponding to the error-detected signals on which beamforming has been performed, based on a predetermined quantization vector corresponding to the index fed back to the transmitting apparatus.

16. A transmitting method comprising:
determining whether to retransmit transmission data according to a predetermined signal fed back from a receiving apparatus;
calculating a beamforming matrix corresponding to a channel matrix based on an index of a predetermined quantization vector fed back from the receiving apparatus according to a result of the determination by referring to a quantization codebook recorded in a memory unit; and
performing beamforming on a transmission signal using the calculated beamforming matrix and transmitting the transmission signal that has undergone the beamforming,
wherein the predetermined quantization vector is selected from among a plurality of quantization vectors included in the receiving apparatus based on a combination channel vector corresponding to a plurality of antennas, and the predetermined quantization vector reduces an angle difference between the predetermined quantization vector and the combination channel vector.

17. A non-transitory computer-readable recording medium having recorded thereon a program to execute the method of claim 9.

18. A non-transitory computer-readable recording medium having recorded thereon a program to execute the method of claim 16.

* * * * *